US010288982B2

(12) United States Patent
O'Connell

(10) Patent No.: US 10,288,982 B2
(45) Date of Patent: *May 14, 2019

(54) MOBILE STUDIO

(75) Inventor: Ian O'Connell, London (GB)

(73) Assignee: Musion IP Limited (GB)

(*) Notice: Subject to any disclaimer, the term of this patent is extended or adjusted under 35 U.S.C. 154(b) by 419 days.

This patent is subject to a terminal disclaimer.

(21) Appl. No.: 13/590,719

(22) Filed: Aug. 21, 2012

(65) Prior Publication Data

US 2013/0002875 A1    Jan. 3, 2013

Related U.S. Application Data

(63) Continuation of application No. 12/468,318, filed on May 19, 2009, now Pat. No. 8,269,900.

(30) Foreign Application Priority Data

Dec. 2, 2008 (GB) .................................. 0821996.6

(51) Int. Cl.
*H04N 5/222* (2006.01)
*G03B 15/00* (2006.01)
*A63J 5/02* (2006.01)
*G03B 35/00* (2006.01)

(52) U.S. Cl.
CPC .............. *G03B 15/00* (2013.01); *A63J 5/021* (2013.01); *G03B 35/00* (2013.01); *H04N 5/222* (2013.01)

(58) Field of Classification Search
None
See application file for complete search history.

(56) References Cited

U.S. PATENT DOCUMENTS

| 111,694 A | 2/1871 | Shear |
| 1,053,887 A | 2/1913 | Sontag |
| 1,358,110 A | 11/1920 | Presicce |

(Continued)

FOREIGN PATENT DOCUMENTS

| DE | 3610218 A1 | 10/1987 |
| DE | 3808406 A1 | 4/1989 |

(Continued)

OTHER PUBLICATIONS

English Machine Translation of Nakano et al. (JP 2008-046410 A).*

(Continued)

*Primary Examiner* — Mohammed Jebari
(74) *Attorney, Agent, or Firm* — Waller Lansden Dortch & Davis, LLP; Blake M. Bernard

(57) ABSTRACT

A mobile studio for producing video and audio content includes a vehicle having a body mounted on a chassis. The body includes a studio chamber enclosure formed by a floor, a ceiling, spaced opposite outer side walls and spaced outer front and rear walls, and the floor includes a stage area. The mobile studio further includes at least one LED lighting assembly located in the studio chamber enclosure that is suitable for providing sufficient illumination for image capture such that a captured image is suitable for projection as a Pepper's Ghost image, at least one camera to capture an image of a subject on the stage area and generate the captured image, and a communications device to transmit the captured image.

19 Claims, 3 Drawing Sheets

(56) References Cited

U.S. PATENT DOCUMENTS

| | | | |
|---|---|---|---|
| 1,698,221 A * | 1/1929 | Craig | G02B 27/2207 352/86 |
| 2,198,815 A | 4/1940 | Haskin | |
| 2,336,508 A * | 12/1943 | MacLean | G03B 21/00 352/89 |
| 3,035,836 A | 5/1962 | McCulley | |
| 3,243,858 A | 4/1966 | Elanson | |
| 3,251,908 A | 5/1966 | Wilenius | |
| 3,577,583 A | 5/1971 | Amann | |
| 3,776,382 A | 4/1973 | Nright | |
| 4,019,656 A | 4/1977 | Spears | |
| 4,095,360 A | 6/1978 | Dinan | |
| 4,188,358 A | 2/1980 | Withoos | |
| 4,717,248 A * | 1/1988 | LaRussa | 359/857 |
| 4,805,895 A | 2/1989 | Rogers | |
| 4,816,153 A | 3/1989 | Ando | |
| 4,927,238 A | 5/1990 | Green | |
| 4,928,301 A | 5/1990 | Smott | |
| 4,971,312 A | 11/1990 | Weinreich | |
| 4,986,205 A | 1/1991 | Somers | |
| 5,117,285 A | 5/1992 | Nelson et al. | |
| 5,159,445 A | 10/1992 | Gitlin et al. | |
| 5,181,122 A | 1/1993 | Ooishi | |
| 5,194,955 A | 3/1993 | Yoneta et al. | |
| 5,255,028 A | 10/1993 | Biles | |
| 5,317,405 A | 5/1994 | Kuriki et al. | |
| 5,357,659 A | 10/1994 | Ackermann | |
| 5,406,176 A | 4/1995 | Sugden | |
| 5,429,335 A | 4/1995 | Cunningham | |
| 5,528,425 A * | 6/1996 | Beaver | A63J 5/021 352/85 |
| 5,559,632 A * | 9/1996 | Lawrence | G02B 27/2207 348/E13.008 |
| 5,573,325 A | 11/1996 | Lekowski | |
| 5,619,254 A | 4/1997 | McNelley | |
| 5,639,151 A | 6/1997 | McNelley et al. | |
| 5,666,155 A | 9/1997 | Mersereau | |
| 5,669,685 A | 9/1997 | Kotani et al. | |
| 5,685,625 A | 11/1997 | Beaver | |
| 5,769,527 A | 6/1998 | Taylor | |
| 5,777,665 A | 7/1998 | McNelley et al. | |
| 5,793,470 A | 8/1998 | Haseltine | |
| 5,809,624 A | 9/1998 | Akamae | |
| 5,835,268 A | 11/1998 | Stechly | |
| 5,865,519 A * | 2/1999 | Maass | 353/28 |
| 5,890,787 A | 4/1999 | McNelley et al. | |
| 5,913,591 A | 6/1999 | Melville | |
| 5,915,132 A | 6/1999 | Counts | |
| 5,953,052 A | 9/1999 | McNelley et al. | |
| 5,960,074 A * | 9/1999 | Clark | 379/310 |
| 6,042,235 A | 3/2000 | Machtig et al. | |
| 6,068,042 A | 5/2000 | Blond | |
| 6,129,649 A | 10/2000 | Yang | |
| 6,144,360 A | 11/2000 | Evanicky | |
| 6,149,283 A | 11/2000 | Conway | |
| 6,243,130 B1 | 6/2001 | McNelley et al. | |
| 6,290,359 B1 | 9/2001 | Shriver | |
| 6,431,711 B1 | 8/2002 | Pinhanez | |
| 6,481,851 B1 | 11/2002 | McNelley et al. | |
| 6,654,045 B2 | 11/2003 | Allen et al. | |
| 6,710,797 B1 | 3/2004 | McNelley et al. | |
| 6,783,247 B2 | 8/2004 | White | |
| 6,882,358 B1 | 4/2005 | Schuster et al. | |
| 6,945,653 B2 | 9/2005 | Kabori | |
| 6,981,782 B2 | 1/2006 | Kai | |
| 7,057,637 B2 | 6/2006 | White | |
| 7,136,090 B1 | 11/2006 | McDuffie White | |
| 7,209,160 B2 | 4/2007 | McNelley et al. | |
| 7,460,299 B2 | 12/2008 | Ogawa | |
| 7,497,159 B2 | 3/2009 | Kasuya | |
| 7,515,367 B2 | 4/2009 | Hewlett | |
| 7,554,729 B2 | 6/2009 | Sumida | |
| 7,668,371 B2 | 2/2010 | Dorai | |
| 7,850,011 B2 | 12/2010 | Fisher | |
| 8,323,027 B2 | 12/2012 | George | |
| 2002/0080463 A1 | 6/2002 | Tonar | |
| 2002/0149617 A1 * | 10/2002 | Becker | 345/751 |
| 2003/0035917 A1 | 2/2003 | Hyman | |
| 2003/0117583 A1 | 6/2003 | Werhahn-Wunderlich | |
| 2003/0133044 A1 | 7/2003 | Akiyama | |
| 2003/0174292 A1 | 9/2003 | White | |
| 2004/0043649 A1 | 3/2004 | O'Connell et al. | |
| 2005/0018148 A1 | 1/2005 | Hasegawa | |
| 2005/0111832 A1 | 5/2005 | Okauchi | |
| 2005/0142371 A1 | 6/2005 | Swain et al. | |
| 2005/0237381 A1 | 10/2005 | White | |
| 2006/0018112 A1 * | 1/2006 | Seymour | F21S 2/005 362/147 |
| 2006/0163121 A1 | 7/2006 | Fisher | |
| 2006/0233544 A1 | 10/2006 | Coppola | |
| 2007/0045524 A1 | 3/2007 | Rains | |
| 2007/0098368 A1 * | 5/2007 | Carley et al. | 386/96 |
| 2007/0153375 A1 | 7/2007 | Peterson | |
| 2007/0197700 A1 | 8/2007 | Gallucci et al. | |
| 2007/0201004 A1 * | 8/2007 | O'Connell et al. | 353/10 |
| 2007/0229948 A1 | 10/2007 | Imafuku | |
| 2007/0268700 A1 | 11/2007 | Hough | |
| 2007/0297320 A1 * | 12/2007 | Brummette et al. | 370/208 |
| 2008/0075436 A1 | 3/2008 | Ryckman | |
| 2008/0219554 A1 | 9/2008 | Dorsi | |
| 2008/0232079 A1 | 9/2008 | Awazu | |
| 2009/0231414 A1 * | 9/2009 | Graham | H04N 5/2224 348/14.08 |
| 2009/0244303 A1 * | 10/2009 | Kinoshita | H04N 5/23245 348/218.1 |
| 2009/0316260 A1 * | 12/2009 | Howes | 359/443 |
| 2010/0014053 A1 * | 1/2010 | Brentnall, III | G02B 27/2292 353/7 |
| 2010/0253700 A1 | 10/2010 | Bergeron | |

FOREIGN PATENT DOCUMENTS

| | | |
|---|---|---|
| DE | 3807598 A1 | 9/1989 |
| DE | 19915943 A1 | 10/2000 |
| EP | 1133658 | 6/2000 |
| FR | 389185 A | 9/1908 |
| FR | 408191 A | 3/1910 |
| FR | 2714741 A1 | 7/1995 |
| GB | 23473 | 9/1900 |
| GB | 1097812 | 1/1968 |
| GB | 2039680 A | 8/1980 |
| GB | 2267563 A | 12/1993 |
| GB | 2321565 A | 7/1998 |
| GB | 2357829 A | 7/2001 |
| JP | 63228890 A | 9/1988 |
| JP | 2001313849 A | 11/2001 |
| JP | 2003007103 A | 1/2003 |
| JP | 2004131837 A | 4/2004 |
| JP | 2005043490 | 2/2005 |
| JP | 2007064996 A | 3/2007 |
| JP | 2007143076 A | 6/2007 |
| JP | 2008046410 A * | 2/2008 |
| JP | 2008102946 A | 5/2008 |
| WO | 8905682 A1 | 6/1989 |
| WO | 0111880 A1 | 2/2001 |
| WO | 2005096095 A1 | 10/2005 |
| WO | 2005107116 A2 | 11/2005 |
| WO | 2006070675 A1 | 7/2006 |
| WO | 2007052005 A1 | 5/2007 |
| WO | 2007072014 A2 | 6/2007 |
| WO | 2008040670 A1 | 4/2008 |
| WO | 2008068016 A1 | 6/2008 |

OTHER PUBLICATIONS

English Abstract of DE3610218.
English Abstract of DE3807598.
English Abstract of DE3808406.
English Abstract of DE19915943.
English Abstract of FR2714741.
English Abstract of JP63228890.
English Abstract of JP2001313849.
English Abstract of JP2003007103.

(56) References Cited

OTHER PUBLICATIONS

English Abstract of JP2004131837.
English Abstract of JP2007064996.
English Abstract of JP2007143076.
English Abstract of JP2008046410.
English Abstract of JP2008102946.
English Abstract of WO2006/070675.
English Abstract of WO2008/068106.

* cited by examiner

MOBILE STUDIO

CROSS-REFERENCE TO RELATED APPLICATION

This application is a Continuation application that claims priority to U.S. Utility patent application Ser. No. 12/468,318, filed May 19, 2009, which issued as U.S. Pat. No. 8,269,900, entitled "Mobile Studio," on Sep. 18, 2012 and claims priority to Great Britain Patent Application No. 0821996.6, filed Dec. 2, 2008, both of which are entirely incorporated herein by reference.

FIELD OF THE INVENTION

The present invention relates to an apparatus and method for producing, transmitting and receiving information from a mobile unit. In particular, real time communication of high definition video and sound from a mobile broadcast studio.

BACKGROUND OF THE INVENTION

In recent times, videos and motion pictures have been made outside of a motion picture or photography studio at an on site location where the products are made or used. In these instances, the video or motion picture recording apparatus or devices have been brought to the site. However, in a number of instances, it is not possible to move a video or motion picture studio and this presents a problem in the finishing process of the video or motion picture works.

In order to produce television or video contributions, a plurality of picture signal sources are generally available simultaneously. To select given picture signal sources from the multitude of such sources and process picture signals in accordance with artistic viewpoints, several devices for processing the picture signals are provided in a television studio. The picture signal sources which are available are, for example, cameras, magnetic tape recorders, external inputs or other sources. The picture signals processed by the picture signal-processing devices are applied via outputs to, for example, transmission lines, monitors or other components. The specific requirements being different for various types of broadcasts.

Dependent on the desired purpose and use, certain cameras, processing and transmission devices, lighting requirements, and stage layouts are required. For example, the projection of an image upon a partially reflective screen such that is observable by a viewer positioned in front of the screen is known, the so-called "Peppers ghost" arrangement that is known from fairground shows. This technology has been applied to publicity and promotional displays where a presenter resides behind an inclined, partially reflective screen, typically a tensioned foil, onto which an image of, for example, a motor vehicle is projected, via at least one reflective surface. The location of the presenter behind the projected image has a number of inherent advantages over systems where the presenter stands in front of a screen, not least of which is that the presenter does not obscure the projected image when walking across the projected image. Additionally, the use of an inclined screen results in a viewer of the image perceiving the image as having depth rather than merely being a two dimensional image, for example where a motor vehicle is seen to rotate upon a turntable.

In order to provide such a system is to a large degree dependent upon a suitable communications link and lighting equipment capable of facilitating the desired level of interaction. Previously, in order to provide such a system a customer would have to travel to a studio in order to produce the projection of an image upon a partially reflective screen (ie Peppers Ghost image).

A suitable communications link is required which can provide a dedicated line capable of guaranteeing the necessary minimum m/bits transmission speed consistently. For this, a network provider is required and you must pay a financial premium to have a high bandwidth network installed. The network provider typically charges fees in respect of installation, ongoing network management or provision (management of the network line capacity to ensuring the network line is continually providing the data transfer rate speeds required) and bandwidth consumption.

Installation of such a high speed network service represents a significant investment in time, equipment infrastructure and thus expense. Rather like conventional broadband Internet, which in itself is not available to every location in every part of a country, the availability of high speed network connections suitable for carrying broadcast quality streaming video vary from place to place and are currently more limited and a good deal more expensive than conventional broadband Internet.

The reasons for this are many. Key factors are that high speed network vendors are fewer than Internet vendors serving consumer markets. The cable infrastructure (typically glass fibre optic) required for high speed network services is not as far reaching or ubiquitous as regular copper wire. The costs of adding a fibre optic network to the existing cable infrastructure is high—not least because of the need to dig up roads to lay new cabling. The challenge of delivering and regulating high speed bandwidth requires more sophisticated equipment than consumer Internet demands.

There is currently a need for capturing and broadcasting an image for use in a "Peppers ghost" arrangement from a remote site. In other words there is a need for a system which is mobile in that the system travels to the customer rather than vice versa.

There is also currently a need for a mobile studio which can broadcast or receive signals in 1080i 50 Hz-120 Hz format such that the image formed at the receiving end is a virtual image, wherein the image is perceived as having depth rather than merely being a two dimensional image of the subject being transmitted at the broadcast point. There is also currently a need for a system that is capable of simultaneously transmitting both a full size walking talking human and streaming graphics or pictures such that, to the viewing audience, the person appears as a life like virtual image of the subject and the graphics or pictures appear alongside that person as one complete seamless image on a live stage. There is also currently a need for a mobile studio system that can offer all of the above features to customers in remote locations needing such features whereby those services could be provided to those customers, even if thousands of miles apart, with just a few hours notice rather than weeks of waiting before and communications link is even established.

Also, as the illusion of a Peppers ghost image relies on the reflected image formed by light contrasting with its immediate surroundings and background there is also a requirement for specific lighting. The stronger the reflected image, the more solid that reflected image looks, the more vibrant the colours will be, and the more visible the reflected image is to an audience. In circumstances where the presenter may be unable to control high levels of ambient light forward of the foil, e.g. from an auditorium at a trade show, the high level of ambient light results in significant levels of reflection of the ambient light from the screen detracting from the strength of the reflected image over the background.

The lighting used in studios are typically tungsten lights designed specifically for film or photography which produces light of a colour around 3200-3400 deg K. Tungsten lights are rather bulky in there design and as such take up a considerable amount of room in a studio. Therefore do not lend themselves to be used in a mobile studio environment were space is at a premium. Tungsten lights also produce a large amount of heat, which once again means that they are not suitable for a mobile studio, as they require environmental control systems. Tungsten lights produce far more heat than light and are both intimidating and very uncomfortable for the subject being recorded.

Because of the amount of heat that tungsten lights produce it is difficult and expensive to fit them with modifiers such as softboxes, they can melt lighting gels, polarising gels will be ruined by the heat and the lamps are liable to 'blow' if they are moved or adjusted when they are switched on or still hot. Also, because of the amount of heat that tungsten lights produce they present a very real risk of fire. Although tungsten lights appear to be very bright, tungsten lights produce a very low level of actual light and so they are less than ideal if short shutter speeds are needed, or if a small aperture is needed for depth of field.

Accordingly, it is desirable to develop a movable or transportable video studio capable of a real time communication enabling the two-way interaction between two or more persons located remotely of one another.

Any discussion of documents, acts or knowledge in this specification is included to explain the context of the invention. It should not be taken as an admission that any of the material forms part of the prior art base or the common general knowledge in the relevant art.

SUMMARY OF THE INVENTION

According to a first aspect, the present invention provides a mobile studio for producing video and audio content, the mobile studio comprising: a vehicle comprising a body mounted on a chassis, said body having a studio chamber enclosure formed by a floor, a ceiling, spaced opposite outer side walls and spaced outer front and rear walls, wherein the floor of the studio chamber comprises a stage area; at least one LED lighting assembly located in the studio chamber suitable for providing sufficient illumination for image capture such that the captured image is suitable for projection as a Pepper's Ghost image; at least one camera to capture the image of a subject on the stage area; and a communications device to transmit the captured image.

The camera used to capture the image may be a high definition (HD) camera. The at least one LED lighting assembly may comprise a light emitting diode (LED) assembly having a low profile allowing them to be unobtrusively mounted to the ceiling and/or the side walls and/or the outer front and rear walls of the studio chamber. The mobile studio may further comprise at least one device for compressing and/or encoding the captured image which may comprise a codec connected to the output of the at least one camera. The communications device may comprise a high speed network connection suitable for carrying broadcast quality streaming video signals. The communications device may comprise a microwave radio wave transmitter, or preferably or optionally a satellite transmitter. The microwave radio transmitter may be adapted to transmit the radio signal to and from a microwave base station using a unidirectional or omni-directional antenna. The microwave radio wave transmitter may have a signal latency of less than 200 ms, or preferably or optionally a signal latency of less than 100 ms. At least one video monitor may display an image and at least one audio recording device to record and broadcast voice and sound. The at least one video monitor may comprise a greater than 20 inch HD monitor. The studio chamber may further comprise a non-reflecting light absorbing material suitable for a background, the material located on an inside surface of the outer rear wall. The studio chamber may comprise a sound deadening material applied to the walls of the studio chamber to provide a high acoustic performance. The apparatus may further comprise determining the camera shooting height of the at least one camera in order to be inline with the eyeline height of the subject on the stage.

According to a further aspect, the present invention provides a method of producing video and audio content from a mobile studio, the method comprising the steps of: providing a vehicle comprising a body mounted on a chassis, said body having a studio chamber enclosure formed by a floor, a ceiling, spaced opposite outer side walls and spaced outer front and rear walls, wherein the floor of the studio chamber comprises a stage area; forming a virtual image; lighting the studio chamber with at least one LED lighting assembly to provide sufficient illumination for image capture such that the captured image is suitable for projection as a Pepper's Ghost image; capturing the image of a subject on the stage area; and transmitting the captured image using a communications network.

Capturing the image may be performed by at least one high definition (HD) camera. Lighting the studio chamber with at least one LED lighting assembly may comprise providing a light emitting diode (LED) assembly having a low profile allowing them to be unobtrusively mounted to the ceiling and/or the side walls and/or the outer front and rear walls of the studio chamber. The method may further comprise compressing and/or encoding the captured image which may comprise providing a codec connected to the output of the at least one camera. Transmitting the captured image may comprise providing a high speed network connection suitable for carrying broadcast quality streaming video signals. The method may further comprise providing at least one video monitor to display an image and at least one audio recording device to record and broadcast voice and sound. The method may further comprise providing a non-reflecting light absorbing material suitable for a background, the material located on an inside surface of the outer rear wall. The method may further comprise providing a sound deadening material applied to the walls of the studio chamber to provide a high acoustic performance. The method may further comprise determining the camera shooting height of the at least one camera in order to be inline with the eyeline height of the subject on the stage.

According to a still further aspect, the present invention provides a mobile studio for producing a Pepper's Ghost image, the mobile studio comprising: an image projection apparatus comprising a projector, a frame, a light source and an at least partially transparent screen, wherein the screen is inclined at an angle with respect to a plane of emission of light from the projector, and the light source is arranged to illuminate at least part of the apparatus, the screen having a front surface arranged such that light emitted from the projector is reflected therefrom; and the projector being arranged to project an image such that light forming the image impinges upon the screen such that a virtual image is created from light reflected from the screen, the virtual image appearing to be located behind the screen.

According to a still further aspect, the present invention provides a mobile studio for producing video and audio content, the mobile studio comprising: a vehicle comprising a body mounted on a chassis, said body having a studio chamber enclosure formed by a floor, a ceiling, spaced opposite outer side walls and spaced outer front and rear walls, wherein the floor of the studio chamber comprises a stage area; an image projection apparatus comprising a projector, a frame, a light source and an at least partially transparent screen, wherein the screen is inclined at an angle with respect to a plane of emission of light from the projector, and the light source is arranged to illuminate at least part of the apparatus, the screen having a front surface arranged such that light emitted from the projector is reflected therefrom; and the projector being arranged to project an image such that light forming the image impinges upon the screen such that a virtual image is created from light reflected from the screen, the virtual image appearing to be located behind the screen; at least one LED lighting assembly located in the studio chamber suitable for providing sufficient illumination for image capture such that the captured image is suitable for projection as a Pepper's Ghost image; at least one camera to capture the image of a subject on the stage area; a device for compressing and/or encoding the captured image; a communications device to transmit the captured image; and wherein the mobile studio allows a real time communication of a two-way interaction between two or more subjects located remotely of one another.

An advantage of the present invention is that it provides a system of real time communication enabling two or more people located remotely of one another to exchange a dialogue based on the principals of telephony enhanced by the immersive experience of lowest time latency for a high quality life size head and shoulders motion imagery of participants by way of using a typically high definition video display monitors while maintaining eye to eye contact between participants during conversation and complimented by intelligently lip synched audio.

By providing a mobile broadcast truck trailer capable of sending and receiving audio/visual signals providing an experience for use in larger and/or more public environments. This includes a means of communicating a signal from the truck to meeting rooms with one or more participants for live stage environs (theatre, conference halls, classrooms, museums, trade shows), in store and window front retail displays and presentations appearing to live audiences within the truck including streamed audiovisual signals broadcast from a remote location.

The various features of novelty which characterize the present invention are pointed out with particularity in the claims annexed to and forming part of this disclosure. For a better understanding of the present invention, its operation, advantages and specific objects attained by its use, reference should be had to the accompanying drawings and descriptive matter in which preferred embodiments of the invention are illustrated and described.

DESCRIPTION OF PREFERRED EMBODIMENT

The present invention will be discussed hereinafter in detail in terms of the preferred embodiment of a mobile studio for real time communication of high definition video and sound. In the following description, numerous specific details are set forth in order to provide a thorough understanding of the present invention. It will be obvious, however, to those skilled in the art that the present invention may be practiced without these specific details.

The applicant previous application WO 2005/096095 for "Projection Apparatus and Method for Pepper's Ghost Illusion" which is incorporated by reference describes a virtual image created from light reflected from a screen, where the virtual image appears to be located behind the screen.

Figure 1:
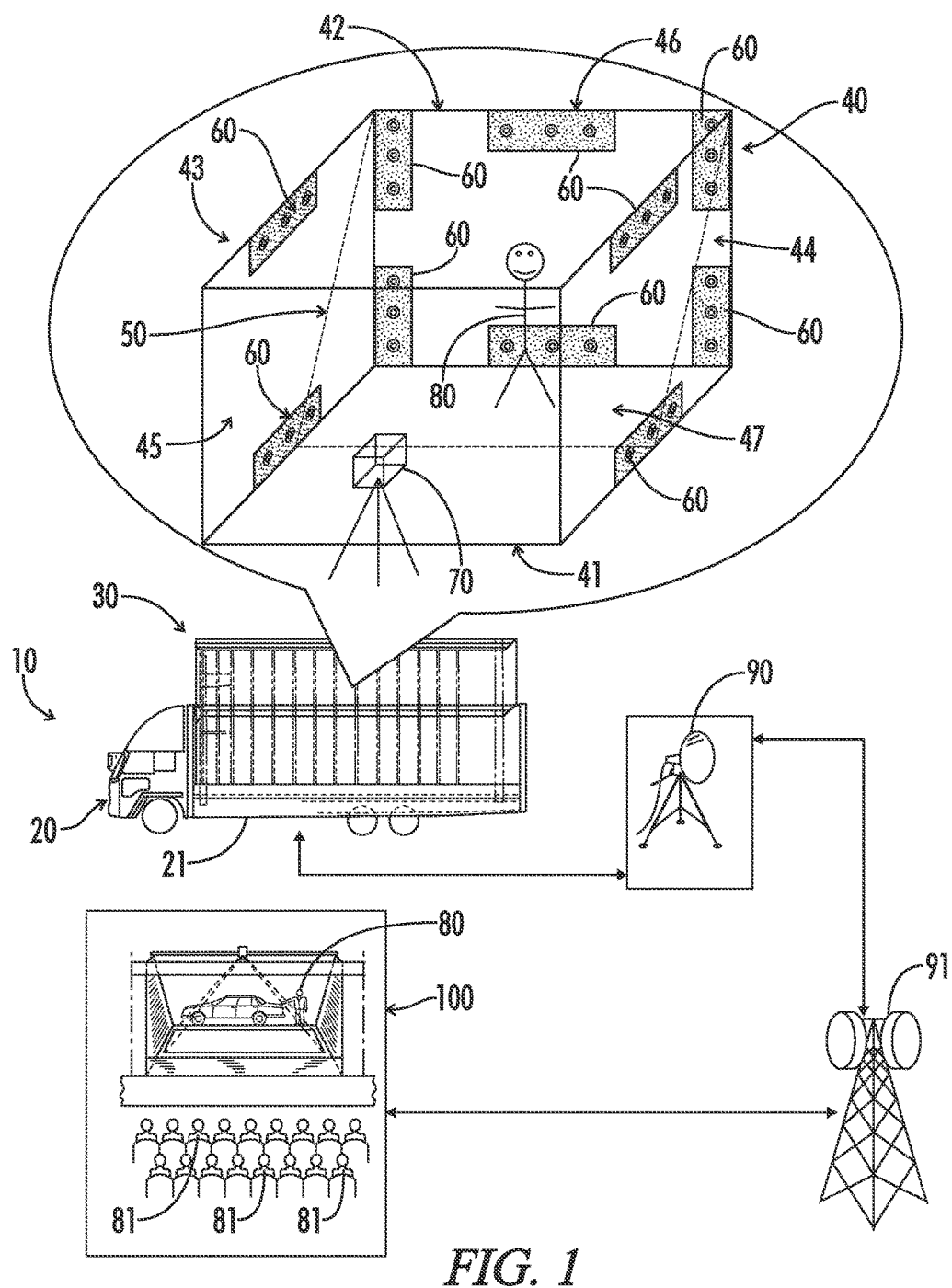
FIG. 1 is a schematic of a mobile studio according to an embodiment of the present invention.

FIG. 1 shows a mobile studio 10 which comprises a stand-alone studio system according to one embodiment of the present invention and includes an enclosure or studio chamber 40 adapted to be moved from a first location to a second location, and temporarily, semi-permanently, or permanently set up at the second location for the purpose of recording video and/or audio aspects of an event performed inside the studio chamber 40. The mobile studio 10 is housed in a custom built body 30 on a rigid chassis 21, the overall size of the mobile studio 10 is dependent upon the size, number of performers, and other factors which determine can vary the actual size of the mobile studio 10 required. The mobile studio is moved by a prime mover/vehicle 20, for example, a lorry being 9.75×3.96×2.44 m (32'×13'×8') and with the studio chamber 40 comprise a mobile broadcast truck or truck and trailer.

The vehicle 20 comprises a body 30 mounted on a chassis 21, the body 30 having a studio chamber 40 enclosure on top of the body 30. The studio chamber 40 is formed by a floor 41, a ceiling 42, side walls 43, 44 and front 45 and rear 46 walls. The enclosure and walls can be constructed from aluminium, timber or any suitable material for forming the outer frame of the mobile studio 10.

As most shoots will involve the recording of sound, a properly sound insulated and acoustically treated studio chamber 40 is preferable. For professional sound high quality microphones are located in the side or ceiling 46 panelling around the stage riser 47 or a personal radio lapel microphone can be attached to the subject as appropriate. The interior of the studio chamber 40 is finished in a sound deadening material applied to the walls of the studio chamber 40 to provide a high acoustic performance. For example wall soundproofing insulation products for walls and cavities designed to reduce sound transfer and sound absorbing products such as panels designed specifically to reduce reverberation time in echo prone environments.

The interior walls of the studio chamber 40 also have a non-reflecting light absorbing material suitable for a background attached or painted on the interior walls of the studio chamber 40. Preferably the non-reflecting light absorbing material is at least located on an inside surface of the outer rear wall 46. For example, black drapes or other suitable light and broadcast signal absorbing material should extend along the entirety of the studio side panel walls 43, 44 down stage of the riser 47. Semi-matt (e.g. 'Harlequin' dance floor) or high gloss surface should be applied to the stage riser 47 surface to accentuate reflection of the filmed subject's shoes.

To create a holographic or floating effect of the images to the viewing audience 81 a good black background is essential. Thus directly behind the stage riser 47 of the filming subject 80 is a non-reflecting, preferably light absorbing material or configuration. A black velvet curtain has been proven in the photographic industry to be used for such purposes. This curtain should extend across the entire back panel rear wall 46 of the studio chamber 40. Alternatively a louvered blind arrangement where in light is able to pass through a louvered blind covered in black light absorbing velvet material is further 'absorbed' by a space behind the louvered blind which itself is faced off in non-light reflecting material. For film shots taken at night where there is no other light interference the louvered partition could be opened to the 'black' outside environment.

The floor 41 of the studio chamber 40 comprises a stage area or platform 47 or a riser forming a stage platform on which the subjects 80 or performers are placed for greater visibility. For example a stage platform (riser) 47 approximately 1' high extends across the width of the studio chamber 40 (generally 9' if arranged at one end of the trailer, or 20 ft-30 feet wide if arranged lengthways across the trailer). Preferably steel deck stage or similar material gives the subject 80 a spatial boundary to work within and should match the dimensions of the show or theatre stage 100 or the camera 70 lens frame area, whichever is smaller. The camera 70 lens frame limits should be explained to the filmed subject and markers set for him to see, though not visible to the camera 70 lens. Although the height of the studio stage platform 47 need not be the same as the show stage 100, the difference is an essential figure in calculating the height of the camera 70. The stage platform 47 also avoids having to set the camera 70 on the studio floor to achieve the correct height.

The studio chamber 40 is used to produce video and audio performances wherein the mobile studio 10 allows a real time communication of a two-way interaction between two or more subjects 80 located remotely of one another. Pepper's ghost is an illusionary technique used in theater and in some magic tricks. Typically using a plate glass and special lighting techniques, it can make objects seem to appear or disappear, or make one object seem to "morph" into another.

In order for the illusion to work, the viewer must be able to see into the main room or theatre 100, but not into the hidden mirror room or mobile studio 10. The edge of the glass may be hidden by a cleverly designed pattern in the floor. In this case the two rooms are located remotely from one another. The mobile studio 10 is located remotely from the theatre or stage 100. Both rooms may be identical mirror-images; this approach is useful in making objects seem to appear or disappear, however it is not required that both rooms are identical if the room or mobile studio 10 in which the subject 80 is completely black inside so as to not include anything other than the subject 80 in the captured image. This effect can also be used to make an actor reflected in the mirror appear to turn into an actor behind the mirror (or vice versa). This is the principle behind the Girl-to-Gorilla trick found in many haunted houses. The mirror room may instead be painted black (as in this case with the mobile studio 10), with only light-coloured objects in it. When light is cast on the objects, they reflect strongly in the glass, making them appear as ghostly images superimposed in the visible room or theatre 100.

The mobile studio 10 is setup as the mirror room and is painted black or has some other method of producing the black interior, for example the black velvet as described above. The mirror effect is created by an image projection apparatus 50 comprising a projector, a frame, a light source and an at least partially transparent screen. The screen is inclined at an angle with respect to a plane of emission of light from the projector, and the light source is arranged to illuminate at least part of the apparatus. The screen has a front surface arranged such that light emitted from the projector is reflected therefrom; and the projector being arranged to project an image such that light forming the image impinges upon the screen such that a virtual image is created from light reflected from the screen. Therefore, the virtual image appears to be located behind the screen.

The lighting of the filming subject 80 may be of any type suitable for providing sufficient illumination for a high definition (HD) image capture. A number of lighting assemblies 60 are located in the studio chamber 40 suitable for presenting an environment of immersive ambience to the audience 81 in a viewing venue or theatre 100 thus producing a compelling mixture of colour and contrast on stage and correctly illuminated live talent on stage and audiences for sharp, realistic signal feeds and audience signal feeds.

Conventional lighting is able to satisfactorily illuminate seated live participants or subjects 80 for the camera 70 lenses to relay sharp HD images upon HD monitor screens. To light the live performer or subject 80 in the mobile studio 10, a more considered approach must be taken. In particular, the lighting required to produce a realistic Pepper's ghost image requires that the lighting behind the subject 80 (rear lighting) is brighter than the lighting in front of the subject 80 (front lighting). This is the opposite to what would normally be provided when lighting a studio to simply capture a 2D image.

The human figure or subject 80 for the purpose of lighting is essentially divided into two main parts (head to waist, waist to feet) but adds left and right control for the back of the head, face (shadow fill) and hair fill as separate elements. Lighting a human figure or subject 80 for a 'holographic' effect needs to fulfil the following criteria.

The lighting must be bright enough to capture subject detail in a uniform manner without dark spots (otherwise image becomes invisible or disappears) or overly bright spots (image burning or bleaching). The lighting should pick out differing textures as well as cast shadow across the subject accentuating form and the passage of light movement across the subject. Back light should form a rim around the subject outline for maximum image sharpness.

The colour temperature of the lighting upon performer or subject 80 should when appearing as the virtual performer on the audience viewing stage 100 yield a skin tone that is natural and matches as close as possible the hue and colour temperature of the skin tones of similar skin types performing as live talent upon the same live audience stage 100.

Preferably the lighting assemblies 60 may be LED based. These low profile instruments are highly efficient and offer a number of advantages over conventional tungsten lighting making them suitable to use in small areas such as the mobile studio 10. The lighting assemblies 60 are also slim in profile allowing them to be light and unobtrusive to mount to the wall/ceiling 42, 43, 44, 45, 46 panels forming an ideal cube of illumination in the studio chamber 40. These lights thus fulfil the requirement to work well in a small space with minimum power consumption, minimal heat emission and most natural daylight looking skin temperature when focused on the film subject 80.

An option for a replacement of the tungsten light is the light emitting diode (LED). These types of lights and lighting assemblies are known from, for example applications such as US 2008259600 "Lighting Apparatus with Adjustable Lenses or Filters" and US 2006181862 "Versatile Lighting Apparatus and Associated Kit" where a lighting apparatus comprises a light panel, a panel frame and a plurality of LEDs.

Figure 2:
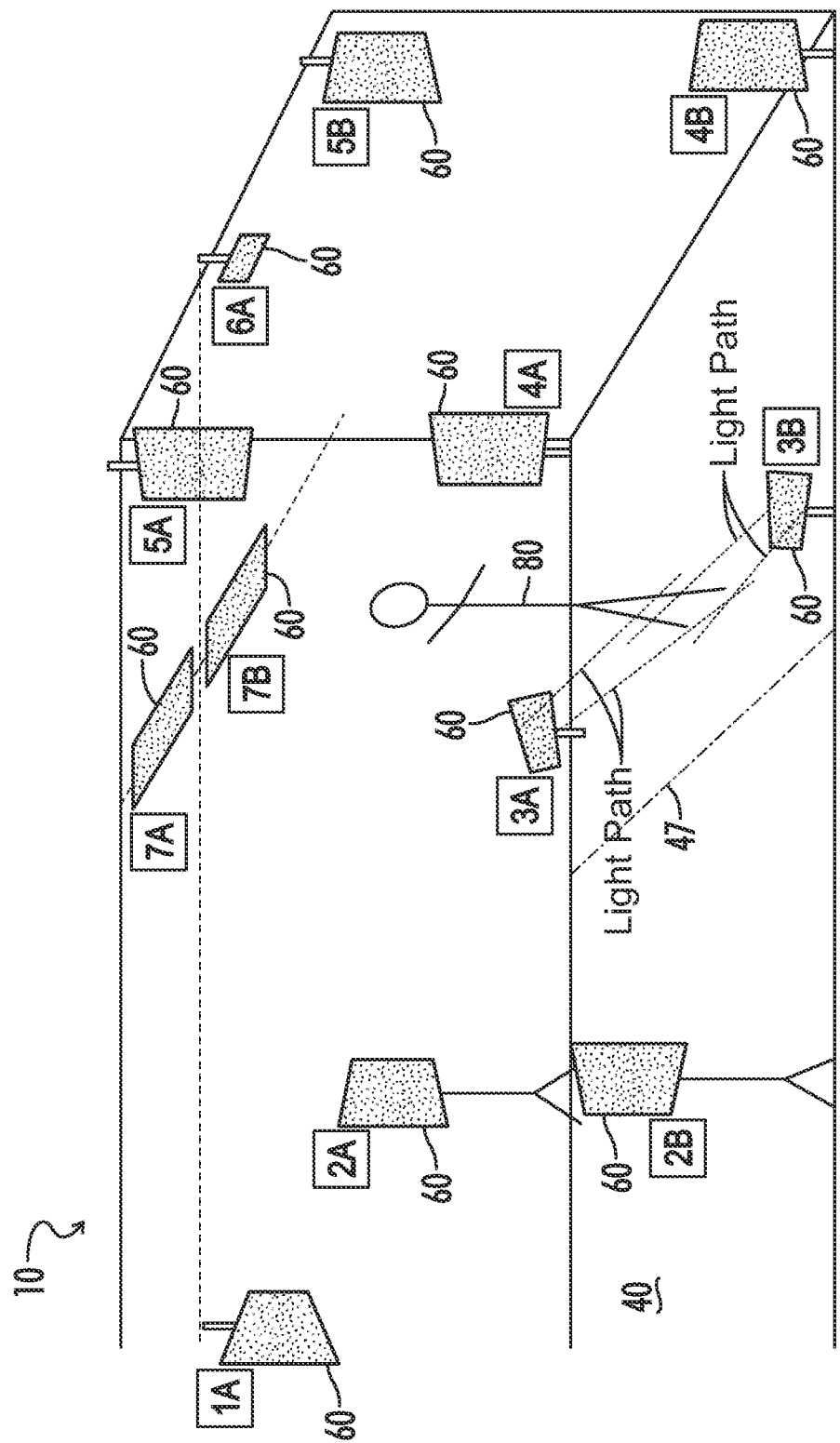
FIG. 2 is a schematic of a studio chamber of the mobile studio of FIG. 1 according to an embodiment of the present invention.

FIG. 2 shows a typical lighting plan for a studio chamber 40 of a mobile studio 10 using lighting assemblies 60. According to this lighting plan, lighting assembly 60 at 1A is lighting primarily the upper part of the body and subject's 80 face with a general flood of light, the intensity and brightness of the lighting assembly 60 at 1A is set to provide this sufficient illumination to highlight the film subject 80 whilst minimising light bleed or spill along the back wall 46.

Lighting assembly 60 at 2A and 2B are used for focused illumination of the subject's 80 darker features such as eye sockets, facial hair and darker clothing/shoes where necessary. 2A and 2B have a semi-opaque diffusion panel immediately in front of the LED array to slightly soften the more brittle beam of the spot light.

Lighting assembly 60 at 3A and 3B will maintain the light intensity balance of the lower part of the subjects 80 body (trousers, shoes and stage riser 47) allowing the film subject 80 to move left and right while maintaining the correct intensity of light.

Lighting assembly 60 at 4A and 4B illuminate from behind the filmed subject 80 to create a general area up to the subject's 80 shoulders creating a rim light effect to sharpen the outline of the subject's 80 body.

Lighting assembly 60 at 5A and 5B offer similar lighting effects of 4A and 4B but for the upper part of the body and the head/hair of the filmed subject 80.

The general impact of 4A, 4B, 5A and 5B add the illusion of luminosity from behind that audience 81 typically view when watching subjects 80 perform on a live stage 100, such as found in a theatre or conference centre.

The lighting assembly 60 at 6A provides rim light to add further sharpness and definition to the filming subjects 80 head. It should be noted that this light assembly 60 may only be used where the height of the studio chamber 40 is sufficient to allow the placement of this light outside the frame of the camera 70 (typically when the ceiling 42 height is greater than 3 meters). For a mobile studio 10 filming system the rear part of the mobile studio 10 may include a modified ceiling 42 adjustable to accommodate this lighting assembly 60.

According to FIG. 2 the lighting plan may further include, lighting assembly 60 at 7A and 7B to provide over head lighting to illuminate film subjects 80 of darker skin complexion or dark hair. In some scenarios it may be advantageous to add some overhead or top light to fill the horizontal areas of the subject. This can also lower the contrast a bit when it is desirous to place the subject realistically in "daylight" or more natural, less theatrical looking environment, as if introducing "ambient skylight". Given that the distance from the subject 80 when standing to the over head light is only a few feet (approx 10') it is advantageous to use a shallow profile cool light that has good "spread". Again the ceiling 42 of the mobile studio 10 would benefit from being raised to at least 1 m above the height of the filmed subject 80 to minimise image bleaching at the points the lights hit the hair and to ensure the lights are not caught within the camera frame.

Alternatively lighting panels 60 which angle the individual LED lamps on the lighting panel 60 may be used. This allows the lighting panels 60 to be mounted in a more flat or parallel fashion to the studio's walls and ceilings. This could be particularly useful in a booth constructed so that the illumination devices are flush fastened to the walls or built in to the structure.

To capture the image of the subject 80 in the studio chamber 40 at least one camera 70 is used to capture the virtual image of a subject 80 on the stage area 47. The camera 70 should have a 1/60th second shutter. This shutter is used to reduce motion blur without shutter artefacts becoming too noticeable. Standard lenses (e.g. Canon HJ21 or 22) are favoured over wide angle zooms. Prime lenses can also be used as long as the camera/stage distance is not compromised by their fixed focal length. The effects of too wide a lens angle include: enlarged hands when gesturing; enlarged head or legs, depending on camera 70 height; the appearance of growing or shrinking with movements towards or away from camera 70; bowed floor line. At 10 m, a lens of 22-25 mm over a 4 m width substantially reduces distortion and is considered ideal if space allows.

A high quality Polarising camera filter is used to control specula reflections from either the floor or subject (orientation by experiment). A full set of tripod legs (tall, baby and HiHat) should be available as the camera 70 height may be very low depending on studio stage riser 47 height and audience eyeline 81. As the shot is a lock-off, the head of the subject 80 needs to have effective pan and tilt locks.

The focal plane of the camera 70 to the subject 80 is more often approximately 18-25 feet (4-6 m). The distance between the camera 70 and the subject 80 is determined by the lens focal length and the subject 80. In this instance in order to capture a full sized standing person 80 that has the ability to extend their arms freely in the frame without falling out of the frame a 40 mm (35 mm format) lens is used. Lenses in this range fall within the "normal" range of a subjective point of view. Assuming the stage riser 47 of 1 foot high is being used to film the subject 80 placing the lens approximately 2' off the ground would allow the point of view of the viewer 81 to be within the normal viewing range for the reflected image to appear natural on a regular raised stage 100 of 3 ft.

In order to produce high performance full size HD motion video image capture and transmission to a live space 100 a HD camera 70 is required. HD video capture consists of an HD camera 70, lighting 60, audio and stage set within which the filming subject 80 performs.

Common standard HD cameras 70 are the Sony models HDW X750, HDW 790, F900R, all of which are single link HD SDI processing 10 bit 422 colour streams at 1.485 Gigabits/per second and F23 which is both a single and dual link HD SDI processing 12 bit 444 colour streams at 2.2 Gigabits/per second. These cameras 70 yield finest picture results using the HD SDI signal at 50/60 frames interlaced per second.

Alternatively progressive cameras 70 may be used and include the Panasonic AJ-HDC27HE 720P Varicam and Red Camera—capable of 4K resolution. However because of progressive signals' higher data capacity demands per frame versus interlaced, it is common for these cameras to film at just 25 frames or in USA, 29.97 frames progressive per second. Progressive signals offer sharpness, particularly for static images when compared with interlaced video, which tends to have softer, less crisp edges.

Therefore a camera 70 utilising a light sensitive high quality wide angle zoom lens with adjustable shutter speed, frame rates adjustable between 25-120 frames per second (fps) interlaced, capable of shooting at up to 60 fps progressive, would address the key range of performance requirements for most kinds of video imagery, from static texts and graphics to streaming images of virtual presenters 80 and even movement artists.

Once the image has been captured by the camera 70, in order to transmit the captured video signal the image must be compressed and/or encoded. For this purpose a codec enabling the sound and vision to be 'packaged up' (encrypted and compressed) in a format optimised for point to point transmission between at least two remote locations is used. An example of such a technique is JPEG which is a commonly used method of compression for photographic images. The degree of compression can be adjusted, allowing a selectable trade-off between storage size and image quality. JPEG typically achieves 10:1 compression with little perceptible loss in image quality.

Preferably the codec includes software for encryption and compression (together Encoding) of video and sound into a data packet which can then be transmitted over the Internet, satellite or radio waves. The codec is often incorporated into a box chassis, much like the casing of a typical small network computer chassis. The codec chassis can have a variable number of inputs and outputs allowing the processing of multiple data streams or SF, inwards (downloading) and outwards (uploading).

The codec is designed and configured to process particular kinds of audio and video streams. This embodiment of the present invention relates in the main to the most common video streams of Broadcast Pal or NTSC (BP NTSC), High Definition signals of 720 horizontal lines progressive (720P), 1920 vertical lines×1080 horizontal lines progressive (1080P) and 1920 vertical lines×1080 horizontal lines interlaced (1080i). Other video standards such as 2K and 4K resolutions could also be used.

The image of the filmed subject 80 upon the studio stage riser 47 captured by the camera 70 lens is compressed or encoded by a codec box connected to the video output of the camera. There may be one or more images captured by using more than one camera 70. Typically, there will be a camera 70 facing the filmed subject 80 which provides the signal to the remote 'live' stage 100 for the viewing audience 81. There may be an additional camera 70 located in one of the side panels of the mobile studio 10 to provide a reference signal of the filmed subject 80 to the live talent performing on the audience stage 100. There may be further cameras 70 deployed for specific tasks—such as close up views of objects the filmed subject 80 is presenting. Each and every camera 70 signal needs to be compressed by the codec so that the signal is transmittable along its communications path by the communication device 90.

The codec box will require sufficient capacity to process each individual camera 70 signal as well as any audio and graphics that the presentation requires. The codec box will have integral to its design or be augmented with a sound echo cancelling delay device. The function of this device is twofold; to allow manual adjustment of the sound signal (such as the speaking voice of the filmed subject 80) to be synchronised with the lip movements of the broadcast video signal appearing on the audience viewing stage 100 and to cancel out echo of the audio signal being broadcast at the audience venue 100 (including the voice of the filmed subject) as it is fed back as a return audio signal to the filming studio.

The encoded signal is then fed directly to a communications connection 90 that the mobile studio 10 interfaces with. Such a connection 90 may be via a fibre optic cable connected to a high speed managed network. The connection point maybe a network exchange box located in a building, in a purpose built box located at a roadside or other outdoor location. This exchange would then eventually feed the signal through its cable network to the points of broadcast—the venue 100 at which the audience 81 viewing stage is located.

In some cases it may not be possible for a cable connection to be made to the network box—either from the mobile studio 10 broadcast signal truck or indeed from a managed cable network to the venue 100 at which the audience 81 viewing stage is located. In this circumstance the mobile studio 10 signal truck could deploy other solutions to transmit or receive the signal. Firstly, the mobile studio 10 could be equipped with a satellite transmitter and receiver. Common broadcast standards based on the "V-Sat" system would provide sufficient bandwidth for a two way signal.

Preferably the mobile studio 10 is equipped with a microwave radio wave transmitter and receiver 90. In this instance the transmitters' purpose is to transmit the broadcast signal to a suitable microwave radio base station 91 using the 5.4 GHz-5.8 GHz 'Wi-MAX' wireless signal frequency. This method of communication uses radio wave transmitters—unidirectional or 360 degree panoramic omni-directional antenna devices currently capable of transmitting bi-directional signals of around 9 mb—sufficient for two HD video signals with audio to the nearest network exchange box. The signal when carried with a direct 'line of sight' between antennas currently has a range of between 5-7 kilometers (3-5 miles). The signals will even transmit successfully even when there is no direct line of sight between the two antennas, in which case the effective range is reduced to a few hundred meters. The signal latency is not unduly compromised (as it might be if the signal's entire journey were reliant on satellite or radio) with a recorded latency of just 5 or 6 milliseconds.

The antennas or transmitting means are part of a communications base station 91 which in turn communicate to other base stations 91 directly or via a series of antennas configured in what is known as 'meshing' of point to point radio signals to form a 'honeycomb' network of multi directional microwave radio communications.

The antennas may be installed in any suitable location to optimise line of sight communication. Such locations may include roof tops of buildings, lamp posts or other building structures of sufficient height or with sufficient open area space surrounding to receive a line of sight signal. The antennas may act as 'client' relay devices simply carrying a signal from one base station 91 to the other or be part of a communications base station 91.

The base station transmitters and receivers are in turn configured to communicate with transmitters and receivers connected to a network exchange box managed by a provider of high speed cable networks. There may be a number of network exchange boxes in any one town or city, each adapted to carry the video signals to and from these mobile studio 10 devices. The principle described here is similar to that used in creating and developing a 3G or Wireless mobile communications network.

The mobile studio 10 users are the performers—filmed subjects 80 and presenters for the viewing audience stage 100. The communications devices 90 are the mobile studio trucks 10. The signal carriers are the managed network providers configuring their networks to include provision for carrying a combination of either satellite, radio or cable based HD video signals.

The above transmission system required involves the broadcast transmission of full life size humans/subjects 80 as a streaming high definition video signal, and the transmission of such an audio/video signals which have an exceptionally minimal latency over great distances. For example the latency of the transmission signal is preferably less than 200 ms or less than 100 ms from signal broadcast point to signal receiving point. Therefore the signal to be transmitted must be able to broadcast or receive signals in 1080i 50 Hz-120 Hz format such that the image formed at the receiving end is a virtual 3D image of the subject 80 being transmitted at the broadcast point.

Figure 3:
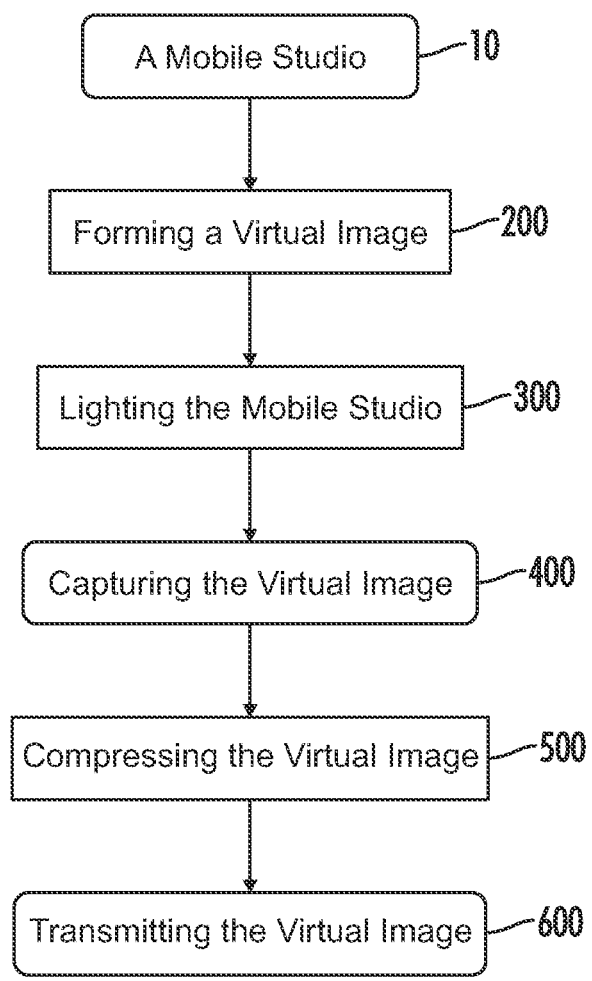
FIG. 3 is a flow diagram of a method of producing video and audio content from the mobile studio of FIG. 1.

FIG. 3 shows the method of producing video and audio content from a mobile studio 10. The method comprises providing a vehicle 20 comprising a body 30 mounted on a chassis 21, the body 30 having a studio chamber 40. The studio chamber 40 formed by a floor 41, a ceiling 42, spaced opposite side walls 43, 44 and spaced outer front 45 and rear 46 walls. Forming a virtual image 200 created from light reflected from a screen located in the studio chamber 40 such that the virtual image 200 appears to be located behind the screen. Lighting 300 the mobile studio 10 to provide sufficient illumination for image capture. Capturing the virtual image 400 of a subject 80 on the stage area 47. Compressing 500 and/or encoding the captured image and transmitting 600 the captured image using a communications network.

The present invention provides a system that is capable of simultaneously transmitting both a full size walking talking human and streaming graphics or pictures such that, to the viewing audience, the person appears as a life like virtual 3D image of the subject 80 and the graphics or pictures appear alongside that person as one complete seamless image on a live stage 100. The mobile studio 10 provides a studio system that can offer all of the above features to customers in remote locations needing such features whereby those services could be provided to those customers, even if thousands of miles apart, with just a few hours notice rather than weeks of waiting before and communications link is even established.

Although the present invention has been illustrated and described with respect to exemplary embodiment thereof, it should be understood by those skilled in the art that the foregoing and various other changes, omission and additions may be made therein and thereto, without departing from the scope of the invention. Therefore the present invention should not be understood as limited to the specific embodiment set out above but to include all possible embodiments which can be embodied within a scope encompassed and equivalent thereof with respect to the features set out in the appended claims.

The invention claimed is:

1. A method of capturing and transmitting to a remote location a live full body video of a subject suitable for a pepper's ghost projection from a mobile studio, the method comprising the steps of:

providing a vehicle comprising a body mounted on a chassis, said body having a studio chamber enclosure formed by a floor, a ceiling, spaced opposite side walls and spaced front and rear walls, said floor of the studio chamber enclosure comprising a stage area, wherein the rear wall of the studio chamber enclosure further comprises a non-reflecting light absorbing material acting as a background for the subject, the non-reflecting light absorbing material located on an inside surface of the rear wall behind the subject being filmed;

lighting a subject on the stage area for image capture with lighting equipment, the subject having a front facing the front wall and a rear facing the rear wall, the lighting equipment including one or more rear lights for illuminating the rear of the subject, the one or more rear lights operable to sharpen an outline of the subject, and one or more front lights for illuminating the front of the subject, wherein the one or more front lights are angled to minimize projection of light or light spill from the one or more front lights onto the rear wall, the lighting equipment configured to cast shadows across the subject as the subject moves under the lighting equipment and the light moves across the subject such that the captured video is suitable for projection as a full body video of a Pepper's Ghost projection;

capturing a video of the subject on the stage area to generate the captured video, wherein the step of capturing the video of the subject on the stage area is performed by at least one high definition (HD) video camera;

transmitting the captured video to the remote location in real time using a wireless mobile communications network, receiving from the remote location a return signal transmission and feeding the return signal transmission to the filming studio; and canceling out audio of the return signal transmission from the audio of the captured video before transmitting the captured video to the remote location in order to minimize incident echo of the subject audio echoing back to the subject in the return signal transmission from the remote location.

2. The method of claim 1, wherein the step of transmitting the captured video comprises transmitting the captured video using a high speed network connection suitable for carrying broadcast quality streaming video signals.

3. The method of claim 1, further comprising the step of positioning the at least one HD camera so that a camera shooting height of the at least one HD camera is inline with an eyeline height of the subject on the stage area, wherein the video is captured in 2K or 4K resolution.

4. The mobile broadcast system of claim 1, further comprising the steps of:

providing a projection source for projecting the captured video, a frame and an at least partially transparent screen at the remote location; and projecting the capture video from the projection source, wherein the at least partially transparent screen is inclined at an angle with respect to a plane of emission of light from the projection source for forming a Pepper's Ghost video, the at least partially transparent screen having a front surface arranged such that light from the projection source for forming the Pepper's Ghost video is reflected therefrom such that the light for forming the Pepper's Ghost video impinges upon the at least partially transparent screen such that a virtual image is created from light reflected from the at least partially transparent screen, the virtual image appearing to be located behind the at least partially transparent screen.

5. A mobile broadcast system for capturing and transmitting to a remote location a live full body video of a subject suitable for a live, full bodied, life size pepper's ghost projection of the subject at the remote location, the mobile broadcast system comprising:

a vehicle comprising a body mounted on a chassis, said body having a studio chamber enclosure formed by a floor, a ceiling, spaced opposite side walls and spaced front and rear walls, said floor comprising a stage area, wherein the rear wall of the studio chamber enclosure further comprises a non-reflecting light absorbing material acting as a background for the subject, the non-reflecting light absorbing material located on an inside surface of the rear wall behind the filmed subject;

lighting equipment located in the studio chamber enclosure illuminating a subject on the stage area for image capture, the subject having a front facing the camera and a rear facing away from the camera, the lighting equipment including one or more rear lights for illuminating the rear of the subject, the rear lights operable to sharpen an outline of the subject, and one or more front lights for illuminating the front of the subject, wherein the one or more front lights include one or more LED lights angled to illuminate the front of the subject while minimizing projection of light and light spill from the front lights onto the rear wall, the one or more rear lights having an intensity measured at the subject during filming that is greater than the intensity of the one or more front lights, the lighting equipment configured to cast shadows across the subject as the subject moves under the lighting equipment and the light moves across the subject, such that the captured video is suitable for projection as a full body video of a Pepper's Ghost projection;

at least one high definition (HD) video camera positioned in front of the subject to capture HD video of a subject on the stage area and generate a captured video of the subject, a projection source located at the remote location; and a communications device operable to transmit the captured video to the projection source at the remote location in real time from the HD video camera over a wireless mobile communications network, and receive a return signal transmission from the remote location and feed such transmission back to the filming studio; and an echo cancelling delay device operable to cancel out audio of the return signal transmission from the audio of the captured video before transmitting the captured video to the remote location in order to minimize the incident echo of the subject audio echoing back to the subject in the return signal transmission from the remote location.

6. The mobile broadcast system of claim 5, wherein the communications device comprises a high speed wireless network connection suitable for carrying broadcast quality streaming video signals, wherein the communications device comprises a microwave radio wave transmitter.

7. The mobile broadcast system of claim 6, wherein the microwave radio transmitter is adapted to transmit the captured video via a radio signal to a microwave base station using a unidirectional or omni-directional antenna.

8. The mobile broadcast system of claim 6, wherein the microwave radio wave transmitter has a signal latency of less than 200 ms.

9. The mobile broadcast system of claim 5, wherein the one or more LED lights of the one or more front lights are housed in a frame, the frame being flush mounted in a parallel fashion to one of the front wall, the sidewalls, the ceiling, or the floor of the mobile studio, the LED lights being angled within the frame and at an angle with respect to the front wall, sidewall, ceiling, or floor to which the frame is mounted.

10. The mobile broadcast system of claim 5, wherein the at least one HD camera has a camera shooting height that is about 1 foot higher than the stage area, the camera has a focal length from the subject of about 10 m and the HD camera includes a 22-25 mm standard lens, or the camera has a focal length from the subject of about 4-6 m and the HD camera includes a 40 mm standard lens.

11. The mobile broadcast system of claim 5, further comprising:

at least one video monitor to display an image, the at least one video monitor comprising a greater than 20 inch HD monitor such that the mobile broadcast system allows a real time communication of a two-way interaction between the subject on the stage area and a subject associated with the image from the at least one video monitor.

12. The mobile broadcast system of claim 11, wherein the monitor is operative to display a Pepper's Ghost image.

13. The mobile broadcast system of claim 5, wherein the at least one high definition camera utilizes a light sensitive high quality fixed lens with adjustable shutter speed capable of capturing video at frame rates of between 25-120 frames per second at 1080 lines interlaced, and/or up to 60 frames per second 720/1080 progressive.

14. The mobile broadcast system of claim 13, wherein the camera lens is positioned 1 foot higher than a surface of the stage area of the floor.

15. The mobile broadcast system according to claim 5, wherein the stage area of the floor is covered in a glossy reflective or semi reflective material which accentuates the reflection of the filmed subject's shoes during capture and broadcast of the video.

16. The mobile broadcast system according to claim 5, wherein each of the one or more front lights for the lighting equipment further comprises a light emitting diode (LED) assembly having a low profile panels flush mounted to the front wall of the studio chamber in a parallel fashion, wherein LEDs for each LED assembly are oriented on the low profile panels at an angle with respect to the front wall to minimize projection of light toward the rear wall.

17. The mobile broadcast system according to claim 5, wherein each of the one or more rear lights and one or more front lights comprise different lights oriented for illuminating different sections of the subject, wherein the different sections of the subject comprise vertical sections of the subject.

18. The mobile broadcast system according to claim 5, wherein the one or more rear lights further comprise:

a first rear light for illuminating an upper part of the subject; and a second rear light for illuminating a lower part of the subject.

19. The mobile broadcast system according to claim 5, wherein the lighting equipment further comprises overhead lights positioned substantially directly above the subject.

* * * * *